May 4, 1926.

W. G. HAWLEY 1,583,291

PROPELLER SHAFT

Filed April 14, 1924    2 Sheets-Sheet 2

WITNESSES
Oliver N. Holmes

INVENTOR
William G. Hawley
BY
Knight
ATTORNEY

Patented May 4, 1926.

UNITED STATES PATENT OFFICE.

WILLIAM G. HAWLEY, OF ELMIRA, NEW YORK.

PROPELLER SHAFT.

Application filed April 14, 1924. Serial No. 706,434.

*To all whom it may concern:*

Be it known that I, WILLIAM G. HAWLEY, a citizen of the United States, and a resident of Elmira, county of Chemung, and State of New York, have invented certain new and useful Improvements in Propeller Shafts, of which the following is a specification.

This invention relates to propeller shafts comprising a plurality of shaft sections which are universally coupled in such a way as to permit changes in angularity as well as an axial adjustment with respect to each other. My invention contemplates more especially an automobile propeller shaft in which the relative angularities of the shaft sections change almost continuously while the car is in motion.

The primary object of the present invention is to provide an improved construction and simplified arrangement of parts for taking care of these variations in length and angularity while at the same time avoiding certain undesirable features of other types of propeller shafts which by reason of high pressure and failure in lubrication, are subject to a considerable loss of efficiency by reason of excessive friction.

One of the objects of my invention is to provide an improved combination and arrangement of parts in universal couplings for propeller shafts whereby the driving connections are definitely maintained in such a way as to obviate looseness and rattling of the parts and whereby a more effective grease packing is secured.

Other and more specific objects of invention will appear in the specification, reference being had to the accompanying drawings in which the invention is exemplified in the propelling gear of an automobile.

Figure 1:
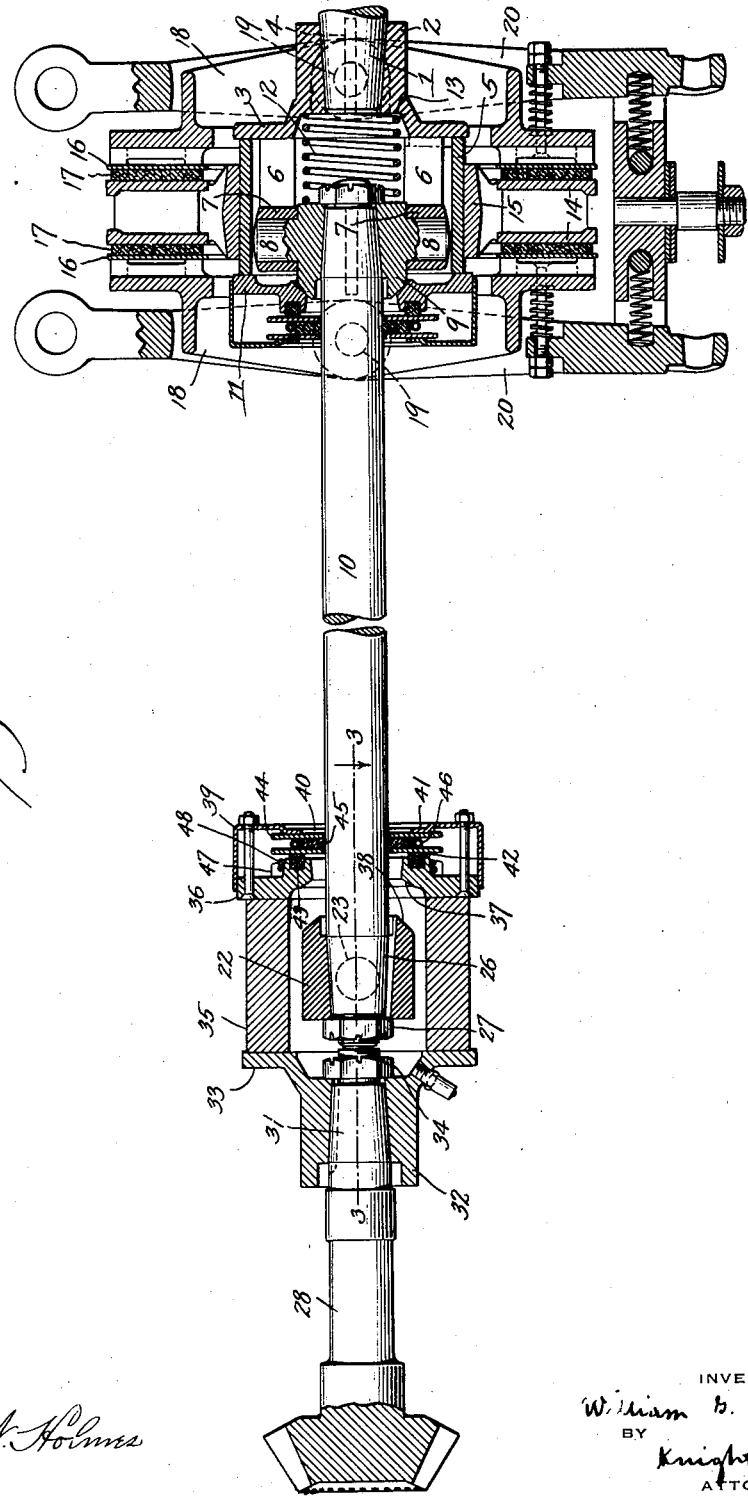
Figure 1 is a plan view of the shaft sections with the universal couplings and other parts shown in section, portions being broken away.
Figure 2:
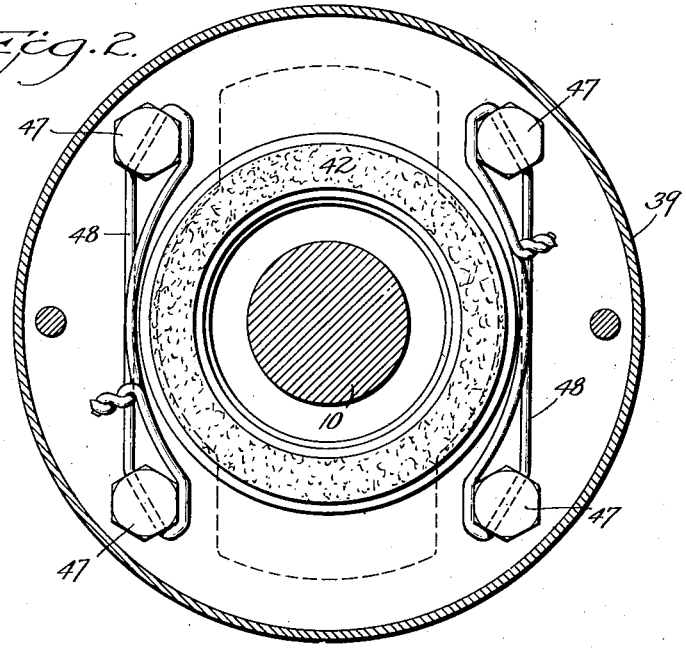
Figure 2 is an enlarged end view of one of the universal couplings, parts being shown in section, said view corresponding to the line 2—2, of Figure 3.
Figure 3:
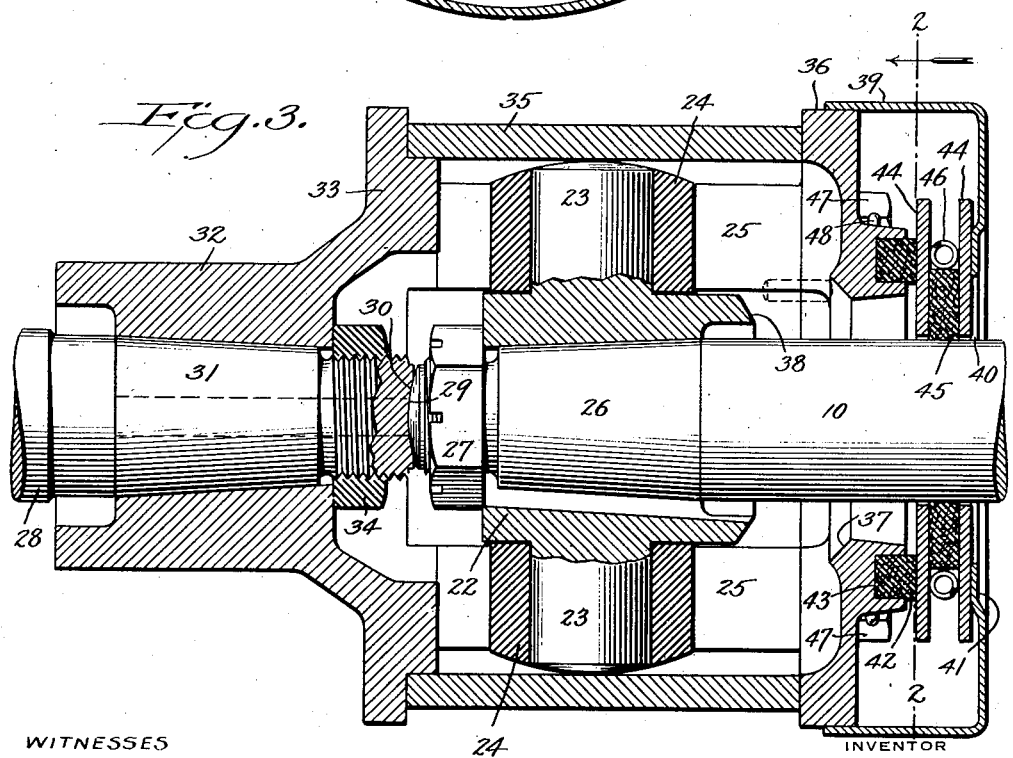
Figure 3 is an enlarged section on the line 3—3, Figure 1, parts being broken away and parts shown in plan.

In the embodiment of my invention shown on the drawings, the propeller shaft comprises a transmission shaft 1, non-rotatably connected by means of a key 4 to the hub portion 2 of a coupling flange 3. Secured to the flange 3 is a cross-head housing 5, provided interiorly with cross-head guides 6, arranged in oppositely disposed pairs. Between these operate the rollers 7 which are journalled upon the oppositely presented pins 8 of a trunnion or cross-head 9. Said trunnion or cross-head is keyed to one end of a universal shaft 10. The housing 5, is provided with a retaining flange 11, which serves to limit the displacement of the cross-head or trunnion 9 under the action of a compression spring 12, said spring being interposed between said cross-head or trunnion and the flange 3 which is provided with a recessed surface 13 for that purpose. The cross-head housing 5 carries a brake disk 14, the central hub 15 thereof being mounted directly upon the outer cylindrical wall of the cross-head housing 5. On opposite sides of this brake disk 14, are arranged brake shoe supports 16 provided with brake shoes 17. Said brake shoe supports 16 are mounted upon annular frames 18 provided with trunnions 19 by means of which they are carried by yokes 20 which may be movably suspended from the chassis (not shown). This construction is clearly shown and described in my copending application on automobile brake, filed October 12th, 1922, and serially numbered 594,144. Keyed to the other end of shaft 10 is the hub 22 of a cross-head or trunnion provided with oppositely presented pins 23. Journalled on pins 23 are rollers 24 which operate between the oppositely disposed guides 25. Preferably, the shaft 10 is provided with a tapered portion 26 to accommodate the tapered inner wall of the hub 22 which is secured in position by a nut 27. In order to provide a suitable end thrust bearing contact between the shaft 10 and the gear shaft 28 driven thereby, the former is provided with a part spherical surface 29 which bears within the cupped surface 30 formed in the reduced end of the shaft 28. Keyed to the tapered end of the shaft 28 is a coupling flange comprising hub portion 32 and flange portion 33, a nut 34 being threaded to the reduced end of said shaft for securing the coupling flange thereto. Secured to the flange 33 is a housing 35 which is partly closed at its other end by a retaining flange 36. By an inspection of Figure 1, of the drawings, it will be seen that the cross-head housings at opposite ends of the universal shaft 10 are provided with lubricant retaining packing devices which are substantially similar in construction and may be described in connection with Figure 3. Thus, the flange 36 is provided with an inwardly presented bevelled bearing shoulder 37 which is adapted to cooperate with an annular bearing shoulder 38 on the hub portion 22 of the cross-head or trunnion to limit the axial displacement of shaft 10 with respect to shaft 28. Mounted upon the retaining flange 36 is a cover 39 provided with a central aperture 40 which permits angular play of the shaft 10. Axially spaced seats are provided within each of the cross-head housings, by means of the inwardly presented surface of an axially displaced annular portion 41 of the cover 39 and the oppositely disposed flat annular surface of a packing ring 42 mounted in a circular recess 43 in the retaining flange 36. Slidably contacting with these axially spaced packing seats and loosely mounted upon the shaft 10 are spaced packing rings 44 which are separated by a compressible packing ring 45 which is pressed snugly against the shaft 10 and crowded between the packing disks 44 by a circumferential coil spring 46, said spring 46 thus operating with a yieldable pressure to press said packing disks 44 against the axially spaced packing seats. By an inspection of Figure 2, in connection with Figure 3, it will be seen that the coupling flange 33, housing 35 and retaining flange 36 are held in their assembled relation by means of bolts 47. If desired the bolts 47 may be locked in position by means of a wire 48 passed thru suitable holes in the heads of said bolts.

I claim:

1. The combination with three shaft sections, of universal couplings connecting and permitting relative axial movements between said shaft sections, one end of the middle shaft section having an end-thrust bearing against one of the other shaft sections to which it is coupled, and yieldable means interposed between the other end of said middle shaft section and the third shaft section, said yieldable means tending to hold the first two shaft sections in end-thrust bearing engagement and the middle and third shaft sections axially extended with respect to each other.

2. In an automobile, three power shaft sections arranged end to end, a universal coupling, arranged between each end of the intermediate shaft section and each of the other shaft sections, a housing for said coupling, means interacting between one of said housings and said intermediate shaft section for limiting the endwise extension between the sections coupled within said housing, an end thrust bearing arranged between the shaft sections coupled within the other of said housings, and means tending to hold said intermediate shaft section extended with respect to the former of said other shaft sections and in end thrust contact with the latter of said other shaft sections.

3. In an automobile, a drive shaft comprising transmission, intermediate and gear shaft sections, a separable end thrust bearing between said intermediate section and one of the other of said sections, universal couplings connecting the opposite ends of said intermediate shaft section to said other shaft sections and permitting relative axial movements, and means interposed between the intermediate shaft section and the other of said other shaft sections for yieldably pressing said intermediate shaft section into position to retain the separable elements of said end thrust bearing in bearing engagement.

4. In an automobile, the combination with a driving shaft section, of a driven shaft section axially spaced therefrom, a universal shaft interposed between said driving and driven shaft sections, universal couplings connecting the opposite ends of said universal shaft to said driving and driven shafts respectively, said couplings permitting relative endwise movements between said shafts, an end thrust bearing between one end of said universal shaft section and said driven shaft section, means for limiting the axial separation between said driving and universal shaft sections, and cushioning means interposed between said universal and driving shaft sections for resisting relative collapse between them.

5. In an automobile, power transmitting shafts connected by a universal coupling permitting relative endwise movements, a housing for said coupling mounted on one of said shafts, said housing being provided with axially spaced seats presented toward each other, disks respectively slidably contacting with said seats and movable axially along the other shaft, a compressible packing snugly fitting said other shaft between said disks, and means yieldably bearing on the outer periphery of the interposed packing for crowding said packing around said shaft and pressing said packing axially against said disks.

6. The combination with a drive shaft, of a driven shaft, a universal coupling connecting said shafts, a housing for said universal coupling mounted on one shaft and provided with an opening permitting free angular play of the other shaft, said housing being provided with axially spaced seats adjacent said opening, disks mounted on said other shaft and laterally contacting with said seats, a compressible packing interposed between said disks and around said other shaft, and means peripherally compressing said packing for crowding it between said disks and around said shaft.

7. The combination with driving and driven units, of a universal shaft interposed between and connected to said units by axially movable universal couplings, one of said units having an end thrust bearing for one end of said shaft, the other of said units being provided with an annular bearing limiting the axial displacement of said shaft in one direction with respect to said other unit, and means interposed between said other unit and the adjacent end of said shaft for normally retaining said shaft in bearing engagement with said annular bearing.

8. The combination with a universal shaft provided with a universal rocking cross-head at each end, of a housing for each of said universal cross-heads, said housing being provided with a guide for the cross-head corresponding thereto, an annular abutment for the cross-head at one end of said shaft, means for yieldably pressing said cross-head against said abutment, and a ball and socket end thrust bearing between the other end of the universal shaft and a shaft to be driven thereby.

9. In an automobile, three power shaft sections, universal couplings connecting and permitting relative endwise movements between said sections, a housing for one of said couplings, said housing being provided with means for limiting the endwise displacement of the sections in either direction, a housing for the other section, the last mentioned housing being provided with means for limiting relative extension of the sections coupled therewithin, and means tending to retain the last mentioned coupled sections extended to a maximum degree.

10. In an automobile, the combination with a shaft carrying a gear which develops end thrust thereon, of a universal shaft, a universal joint connecting said shafts, said universal joint permitting relative axial movement between said shafts, an end thrust bearing between said shafts, a transmission shaft, a universal joint between said universal and transmission shafts and permitting relative axial movement therebetween, and a compression spring interposed between said universal shaft and said transmission shaft, said compression spring tending to maintain said universal shaft in end thrust abutment with said gear shaft.

11. In an automobile, the combination with a shaft carrying a gear which develops end thrust thereon, of a universal shaft, a universal joint connecting said shafts and permitting relative axial adjustment therebetween, an end thrust bearing between said shafts, a transmission shaft, a universal joint between said universal and transmission shafts, the latter universal joint permitting relative axial movement between said universal shaft and said transmission shaft, means for limiting the axial separation between said universal shaft and said transmission shaft, and a compression spring interposed between said universal shaft and said transmission shaft, said compression spring tending to impart a maximum degree of separation between said universal shaft and said transmission shaft.

12. In an automobile, the combination with a shaft subject to end thrust, of a universal shaft, a universal joint connecting said shafts and permitting relative axial adjustment therebetween, an end thrust bearing between said shafts, a transmission shaft, a universal joint between said universal and transmission shafts, the second-mentioned universal joint permitting relative axial movement between said universal shaft and said transmission shaft, a housing for the second-mentioned universal joint, said housing and a portion rotating with said universal shaft being provided with axial thrust bearing shoulders for limiting the axial separation between said universal and transmission shafts, and a compression spring interposed between said universal shaft and said transmission shaft, said compression spring tending to maintain said universal shaft in end thrust abutment with the first-mentioned shaft and said bearing shoulders in bearing contact with each other.

13. In an automobile, shaft sections connected by a universal coupling which permits relative endwise movements between said shaft sections, a housing for said coupling mounted on one of said sections, said housing being provided with a retaining flange having an inwardly presented annular bearing and outwardly presented packing seat extending around the other of said shaft sections, a bearing on said other shaft section adapted to contact with said annular bearing, and packing means slidable axially on the last mentioned shaft section and in slidable contact with said outwardly presented packing seat.

14. In an automobile, power transmitting shafts connected by a universal coupling, a housing for said coupling mounted on one of said shafts, said housing being provided with axially spaced seats presented toward each other, disks slidably contacting with said seats and movable axially along the other shaft, and a shaft packing interposed between and bearing against said disks.

15. In an automobile, shaft sections connected by a coupling, a retaining flange carried by one of said shaft sections, said retaining flange having an annular bearing presented toward said coupling and a packing seat extending around the other of said shaft sections and presented away from said coupling, a bearing on said other shaft section adapted to contact with said annular bearing, and packing means slidable axially on the last mentioned shaft section and in slidable contact with said packing seat.

16. In an automobile, power transmitting shafts connected by a universal coupling, a housing for said coupling provided with axially spaced seats presented toward each other, disks coaxial with one of said shafts, one of said disks slidably contacting with one of said seats and the other of said disks slidably contacting with the other of said seats, a compressible packing snugly fitting said shaft between said disks, and means yieldably bearing on the outer periphery of said compressible packing for crowding said packing around said shaft and against said disks.

WILLIAM G. HAWLEY.